(12) United States Patent
Heng et al.

(10) Patent No.: US 7,656,617 B2
(45) Date of Patent: Feb. 2, 2010

(54) SLIDER AND MANUFACTURING METHOD THEREOF, HEAD GIMBAL ASSEMBLY, DISK DRIVE WITH SAME

(75) Inventors: Chengbu Heng, Hong Kong (CN);
Guowei Li, Hong Kong (CN); Jianhui Huang, Hong Kong (CN)

(73) Assignee: SAE Magnetics (H.K.) Ltd., Hong Kong (CH)

( * ) Notice: Subject to any disclaimer, the term of this patent is extended or adjusted under 35 U.S.C. 154(b) by 569 days.

(21) Appl. No.: 11/389,483

(22) Filed: Mar. 27, 2006

(65) Prior Publication Data

US 2006/0232885 A1    Oct. 19, 2006

(30) Foreign Application Priority Data

Mar. 28, 2005  (JP) ............................. 2005-091671
Jun. 20, 2005  (CN) ....................... 2005 1 0078489

(51) Int. Cl.
*G11B 21/21*  (2006.01)
*G11B 5/60*   (2006.01)

(52) U.S. Cl. ................................. 360/236.5; 360/235.7

(58) Field of Classification Search .............. 360/235.7, 360/236.5, 237, 237.1
See application file for complete search history.

(56) References Cited

U.S. PATENT DOCUMENTS 5,267,108 A  * 11/1993  Tani .......................... 360/236.4
7,240,418 B2 *  7/2007  Sasaki et al. ............. 29/603.12

2002/0063995 A1 *  5/2002  Sannino et al. .......... 360/236.3
2004/0027723 A1 *  2/2004  Ueda et al. ............... 360/235.7

FOREIGN PATENT DOCUMENTS

| JP | 06028651   | A | * | 2/1994 |
| JP | 07220260   | A | * | 8/1995 |
| JP | 11144418   | A | * | 5/1999 |
| JP | 11219574   | A | * | 8/1999 |
| JP | 2000353370 | A | * | 12/2000 |
| JP | 2001155459 | A | * | 6/2001 |
| JP | 2001-229514 |  |   | 8/2001 |
| JP | 2002-312916 |  |   | 10/2002 |
| JP | 2003-323707 |  |   | 11/2003 |

OTHER PUBLICATIONS

English-machine translation of Suzuki et al. (JP 2001-155459 A), published on Jun. 8, 2001.*

* cited by examiner

*Primary Examiner*—William J Klimowicz
(74) *Attorney, Agent, or Firm*—Nixon & Vanderhye P.C.

(57) ABSTRACT

The invention discloses a manufacturing method of slider. The slider comprises an incline portion (6) connecting a read/write portion (24) disposed with a convex configuration on an air bearing surface opposite to a recording medium, and a concave portion (26) adjacent to an end thereof where airflow flows in. The incline portion (6) includes a first incline portion (61) with a substantially linear shape connected with a surface of the read/write portion (24) and a second incline portion (62) with substantially linear shape connected with the concave portion (26). A first incline angle θ1 of the concave portion (26) with respect to the first incline portion (61) is larger than a second incline angle θ2 of the concave portion (26) with respect to the second incline portion (62).

16 Claims, 9 Drawing Sheets

Airflow-in Direction (Prior Art)

SLIDER AND MANUFACTURING METHOD THEREOF, HEAD GIMBAL ASSEMBLY, DISK DRIVE WITH SAME

FIELD OF THE INVENTION

This application claims priority to Japanese Application No. 2005-091671, filed Mar. 28, 2005, and Chinese application No. 200510078489.5, filed Jun. 20, 2005. The entire contents of these applications are incorporated herein by reference.

The present invention mainly relates to a slider for a disk drive and manufacturing method thereof.

BACKGROUND OF THE INVENTION

As a recording media of high speed, sufficient capacity, strong reliability and low cost, disk drives are widely used for digital information recording. With the development of technology for several years, recording density of a disk drive has been developed to exceed over 100 GB per square inch. A plurality of head arm assemblies each of which is comprised of a drive arm and a head gimbal assembly (HGA) disposed on distal end of the drive arm are provided in a disk drive, corresponding to number of disks which function as recording medium. The HGA includes a slider. The slider has a read/write portion incorporating at least one of write element for writing information to the recording medium and read element for reading information from the recording medium. The read/write portion is disposed at one end of the slider. A surface of the slider opposing the recording medium is referred as an air bearing surface (ABS).

When slider performs information recording/reproducing operation on a recording medium, airflow will flow into the gap formed between the slider and recording medium that rotates in a high speed. The airflow comes in from one end opposing to the other end on which the read/write portion is formed, and comes out of the slider from the other end on which the read/write portion is formed. The slider floats slightly over the recording medium due to the airflow. Thus, when airflow-caused floating happens, distance between the recording medium and ABS is named as flying height.

Decreasing of the flying height has benefit to density improvement of the recording medium, since decreasing of the flying height causes bit length of the recording medium decreasing. Therefore, it is required to control the flying height more critically according to demand of higher density of disk drive in recent years.

However, to produce airflow with proper volume between the slider and the recording medium, a concave-convex portion is formed on ABS of the slider for adjusting airflow. The convex portion of the concave-convex portion includes a read/write portion and a rail portion extending along a direction from which the airflow comes in. However, if the read/write portion is coupled to the concave portion with an angle of approximately 90 degree formed there between, that is, if the read/write portion is coupled with an edge portion of substantially right angle, turbulent airflow will be generated at position adjacent the wall of the edge portion, causing instable airflow and easy peeling off of the edge portion, both of which are undesirable. Hence, an incline portion is utilized to connect the read/write portion and concave portion. By formation of the incline portion, along the incline portion, airflow may easily enter into tiny space formed between the read/write portion and recording medium. The incline portion may also be an inclined structure formed by a curved surface segment (see patent reference 1 and FIG. 3(d) of patent reference 2).

For forming this kind of incline portion, ion milling method is used. The method is used for lapping surface of an object to be processed such as substrate in slider manufacturing process and in the method, ions are separated from plasma generated in an ion source chamber in manner of ion beam and guided out of the plasma by a guiding electrode. By forming an angle larger than 90 degree between direction along which the ion beam moves and normal direction of surface of the object being processed (i.e., the ion beam has an inclined incidence angle), and by rotating the object being processed around the normal direction, the ion beam becomes back portion of the overcoat, thus the incline portion being formed with ease. The incline portion may also be formed by reactive ion etching (RIE) method (see patent reference 3). In RIE process, lapping is performed in an environment filled with reactive gases such as $CF_4$, $CH_2$ and $H_2$ to accelerate etching speed.

Patent reference 1: Japanese Application Publication NO. 2001-229514

Patent reference 2: Japanese Application Publication NO. 2002-312916

Patent reference 1: Japanese Application Publication NO. 2003-323707

As described above, it is important to control flying height of the slider for achieving higher recording density of hard disk drive (HDD). For this purpose, it is very critical to control the airflow more easily, and the incline portion needs to be manufactured to have a shape of not limited to planar or curved surface, maybe have a more suitable shape.

On the other hand, it is also important to control variations of the flying height for purpose of controlling the flying height of the slider. For this purpose, length control of the incline portion that generates big floating force thereabout is also critical, and highly precise incline portion should be fabricated without variation. In conventional technology, based on these viewpoints, ion milling method is also used to easily adjust angle of the incline portion and form an incline portion with a curved surface. However, application of ion milling method results in incline portion length variation of 4-5 times as much as that of the target value, as well as increased flying height variation. In addition, when applied to ceramic of high hardness, etching rate will be very slow, thereby causing problems such as low production efficiency.

In addition, different from ion milling in which etching direction is determined by ion incidence angle, RIE belongs to chemical etching using reactive gases, therefore, etching direction control is impossible, adjustment of incline angle and formation of incline structure with specific shape is also difficult to realize. That is, in RIE process, several seconds of time are needed from application of high frequency power to stabilization of the plasma. In this period, depth of at least 10 nm is etched, and etching action in this unstable period becomes reason of variation, thus making it difficult to form the incline structure with fine precision.

SUMMARY OF THE INVENTION

Therefore, considering drawbacks of conventional technology, the invention provides an incline portion structural slider with very small variation of floating, and a slider manufacturing method capable of manufacturing high accurate and variation controllable incline portion.

The slider of the invention comprises a read/write portion disposed with an convex configuration on an air bearing surface opposite to a recording medium, the read/write portion including at least one of a write element for writing information to the recording medium and a read element for reading information from the recording medium; and an incline portion to connect the read/write portion with a concave portion of the air bearing surface, where airflow flows in when the recording medium rotates, an angle of more than 90 degree being formed between a line and surface of the read/write portion, said line connecting the read/write portion and the concave portion. The incline portion includes a first incline portion with substantially linear shape connected with the surface of the read/write portion and a second incline portion with substantially linear shape connected with the concave portion; a first incline angle of the concave portion with respect to the first incline portion is larger than a second incline angle of the concave portion with respect to the second incline portion.

As illustrated above, the incline portion is formed smoothly from the concave portion at one end thereof adjacent the airflow-in direction to the read/write portion, therefore, the airflow is able to flow into tiny space formed between the read/write portion and air bearing surface, thus flying height variation of the slider is controllable.

Firstly, in one embodiment of the invention, preferably, the first incline angle ranges from 25 degree to 35 degree, and the second incline angle ranges from 8 degree to 15 degree. The height of the first incline portion is $1/20$~$1/4$ times as high as the height between the read/write portion and the concave portion. The length of the incline portion along an airflow coming in direction is 4~6 times as large as the height of the convex portion.

Then, in another embodiment, it is preferable that the first incline angle range from 70 degree to 90 degree, the second incline angle range from 2 degree to 5 degree, height of the first incline angle be $1/15$~$1/4$ times as high as the height formed between the read/write portion and the concave portion, and the length of the incline portion along an airflow-in direction is 14~20 times as large as the height of the convex portion.

At least one middle incline portion is formed between the first incline portion and second incline portion of the slider of the invention. Each middle incline portion is connected with each other from the first incline portion to second incline portion, and each middle incline angle is formed between each middle incline portion and respective concave portion. Each middle incline angle is smaller than the first incline angle and decreased gradually from a middle incline portion connected with the first incline portion to another middle incline portion connected with the second incline portion, while larger than the second inclined angle.

A HGA of the invention comprises a slider configured corresponding to the recording medium, and a suspension to resiliently support the slider.

A hard disk drive of the invention comprises a slider disposed corresponding to the rotating recording medium with a circle plate shape, and a positioning device to support the slider and determine position thereof with respect to recording medium.

A slider manufacturing method of the invention means manufacturing a slider which comprises a substrate and an incline portion, said incline portion being disposed with an convex configuration on an air bearing surface opposite to a recording medium of the substrate, said incline portion connecting a write element which writes information to said recording medium with a concave portion of the air bearing surface, the concave portion being a concave portion adjacent one end where airflow flows in when the recording medium rotates, an angle of more than 90 degree being formed between a line and surface of the read/write portion, said line connecting the read/write portion and the concave portion. The method comprises steps of: a step of forming a protective layer on the substrate, said substrate having the read/write portion formed thereon; a step of forming a first incline portion by etching the substrate incorporating the protective layer by reactive ion etching method with a first reactive gas containing $CF_4$ introduced therein, said first incline portion being formed between the substrate and bottom position at one end of the protective layer where airflow comes in, said first incline portion being with substantially linear shape and connected to a surface the read/write portion; a step of depositing coatings on the substrate incorporating the first incline portion by reactive ion etching method with a second reactive gas containing $CF_4$ and $C_2H_2$, said coatings are formed on the first incline portion and a surface of the substrate, the surface of the substrate being adjacent the first incline portion and extending along a direction away from the protect layer; a step of forming a second incline portion by etching the substrate incorporating the coatings by reactive ion etching method with the second reactive gas introduced therein, the second incline portion being with substantially linear shape and connected to the concave portion and surface thereof, the second incline portion making an incline angle between itself and the concave portion, the incline angle being smaller than another incline angle formed the first incline portion and the concave portion.

As illustrated above, after the first incline portion is formed by etching process using the first reactive gas containing $CF_4$, the reactive gas is replaced by a second reactive gas containing $CF_4$ and $C_2H_2$, thus carbon and diamond like carbon (DLC) produced by $C_2H_2$ gas is deposited on the first incline portion and substrate adjacent the first incline portion. In second incline portion forming step, the first incline portion and substrate covered by the coating are protected by the coatings, therefore etching rate thereof is slower than region of the substrate not covered by the coating. As a result, the incline portion of the shape described above may be formed.

In the step of forming a first incline portion, the reactive gas also contains argon (Ar).

The step of forming a first incline portion includes changing the reactive gas directly to the second reactive gas after completion of the step of forming the protect layer, and then performing an etching process for 10-45 seconds.

Preferably, the step of forming a second incline portion includes constant etching process for 1-10 minutes after completion of the step of forming a first incline portion, and reactive gas used in the etching process of the step of forming a second incline portion is still the second reactive gas.

Preferably, the method of the invention may further comprise a step of removing the protective layer using an organic solution after completion of the step of forming a second incline portion, and a step of removing the coating by oxygen ($O_2$) after completion of the step of forming the second incline portion.

As illustrated above, according to the slider of the invention, the incline portion may be formed in a multi-segment structure by combining surfaces with two or more angles, thus providing a slider with an incline structure having small floating variation. In addition, according to the slider of the invention, the multi-segment may be formed by reactive ion etching method, thus enabling reduction of manufacture time and improvement of production efficiency.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
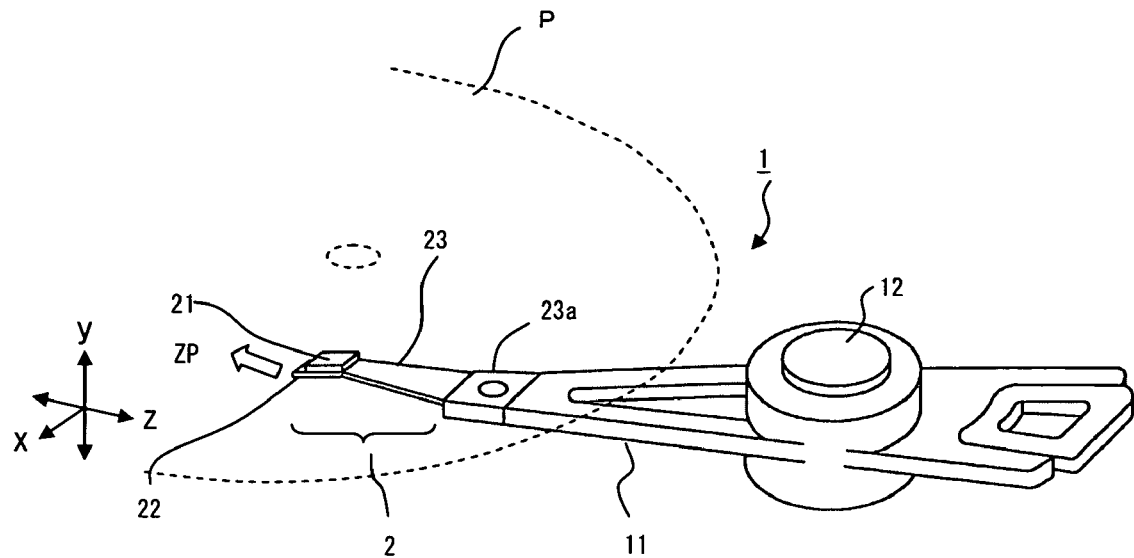
FIG. 1 shows a perspective view of a head arm assembly (HAA) with a slider constructed according to slider manufacturing method of the invention provided on distal end thereof.

Embodiments of slider and manufacturing method thereof of the invention will now be described in detail in conjunction with the drawings. FIG. 1 shows a perspective view of a head arm assembly (HAA) with a slider provided on one distal end thereof. A plurality of head arm assemblies (HAAs) 1 of the same quantity as that of the disks are mounted in a hard disk drive (see FIG. 11). The head arm assembly 1 includes a drive arm 11 supported by a rotary shaft 12 at one end of the drive arm 11 and a head gimbal assembly (HGA) 2 disposed at distal end of the drive arm 11. The HGA 2 has a slider 21 with a thin film head portion 28 (see FIG. 11) formed thereon, a flexure 22 to support the slider 21 and a load beam 23 for connecting the flexure 22 to the drive arm 11. The HAA 1 rotates about the shaft 12 and positions the slider relative to recording medium P in accordance with certain position. Combination of the load beam 23 and a connection plate 23a that mounts the load beam 23 on the drive arm 11 is referred generally as a suspension. In FIG. 1, the slider 21 is disposed under the recording medium P, and the same head arm assembly may also be positioned above the recording medium P.

Figure 2:
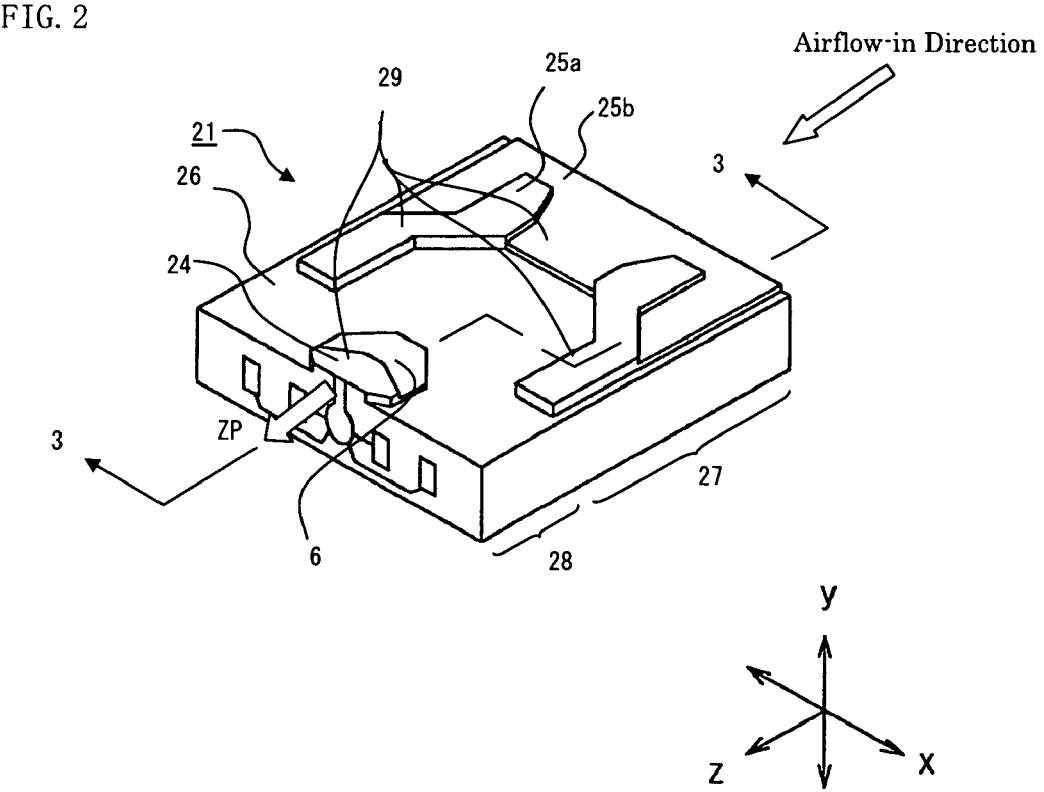
FIG. 2 shows a perspective view of the slider shown in FIG. 1.

FIG. 2 illustrates a perspective view of a slider viewed from air bearing surface (ABS) thereof. The slider 21 is the same as that shown in FIG. 1 and both of them are viewed from an inclined top position. Above the slider 21 disposed is rotary recording medium of disk shape. In FIGS. 1-2, x direction is cross-sectional direction of tracks, z direction is circumferential direction of the recording medium P, and when the recording medium P rotates, z direction is also the direction along which airflow comes in.

The slider 21 comprises a substrate 27 and a thin film head portion 28 formed by layered structure. The slider 21 takes the shape of a cube and the air bearing surface facing the recording medium P is formed by one of six surfaces of the slider 21. The air bearing surface has a read/write portion 24 incorporating a read element/write element of the thin film head portion 28 formed thereon, and also formed on the air bearing surface are rail portions 25a and 25b. All these components form a convex portion 29 of the air bearing surface. An incline portion 6 is provided at one end of the read/write portion 24 where the airflow comes in. The incline portion 6 is connected to the read/write portion 24. The remaining area forms a concave portion 26 of the air bearing surface, and the incline portion 6 is connected at one end of the concave portion 26 where the airflow comes in.

When the recording medium rotates, the airflow flows in along inflow direction of the slider 21, and then flows away from the low end of the thin film head portion 28 of the slider 21 along rotating direction of the recording medium P. That is, the airflow runs into a narrow gap formed between the rail portion 25b and recording medium P, and then after rectified by the rail portions 25a, 25b and incline portion 6, the airflow runs into another gap existing between the read/write portion 24 and recording medium P. A downward lift force is generated by the airflow along y direction of FIGS. 1, 2, thus making the slider 21 floating above the recording medium P.

Figure 3:
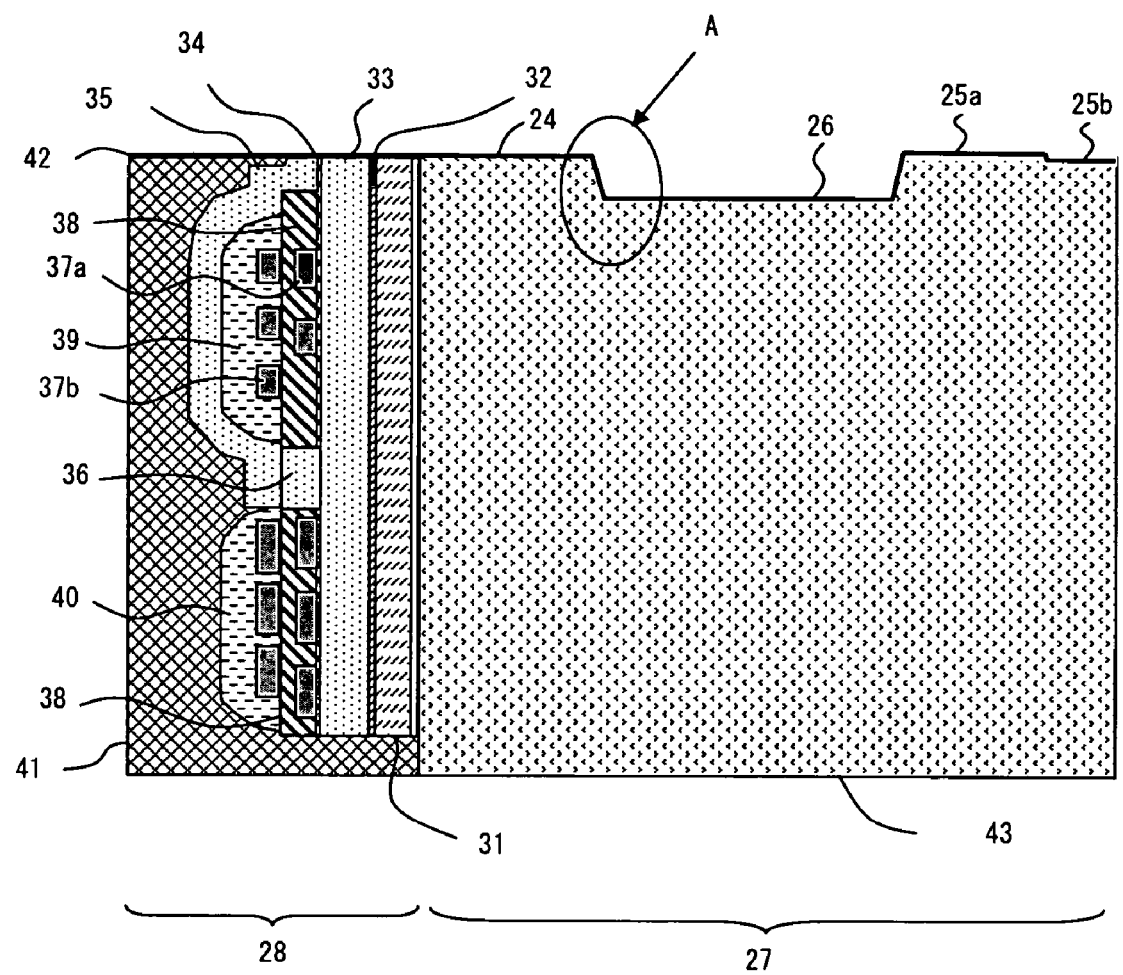
FIG. 3 shows a cross-sectional view of the slider shown in FIG. 2 in a depositing state.

FIG. 3 shows a cross-sectional view of the slider shown in FIG. 2 along 3-3 line of FIG. 2. In FIG. 3, the recording medium P (not shown) extends above the air bearing surface and has a direction perpendicular to drawing plan. The thin film head portion 28 may have a magneto-resist effect element to read magnetic storage information from the recording medium P and an inductive magnetic element to write magnetic storage information to the recording medium P, or may have only one of the above elements. The inductive magnetic element may have a horizontal storage manner in which inner side of the recording medium P is used to store data, or may have a perpendicular storage manner in which outer side of the recording medium P is used to store data.

The thin film head portion 28 is gradually formed by deposition from left side of the figure to a substrate 27 (at right side of the figure) constructed of ceramic material such as $Al_2O_3.TiC$. A shield layer 31 made of an insulator layer, e.g. strong magnetic NiFe is formed on top portion (left side of the figure) of the substrate 27. The shield layer 31 has a read element or MR element 32 formed thereon. The MR element 32 faces the air bearing surface. The MR element 32 may be a magneto-resist film element having magneto-resist effect in use such as an AMR (anisotropic magneto-resistance) element, a GMR (giant magneto-resistance) element, or a TMR (tunnel magneto-resistance) element. In addition, the MR element 32 is connected to a pair of read layers (not shown) for transferring read signals, which have been picked up.

A lower magnetic pole layer 33 constructed of magnetic material is formed on the MR element 32 by forming a film of highly permeable magnetic material such as NiFe or CoNiFe using deposition method. The lower magnetic pole layer 33 functions as a lower magnetic pole layer when used as a lower magnetic pole layer of the storage slider, and an upper shield layer when used as an upper shield layer.

An upper magnetic pole layer 35 is formed above the lower magnetic pole layer 33 with a storage gap 34 existed therebetween for insulation purpose. The storage gap 34 may be made of non-magnetic material capable of forming a film by means such as depositing NiP. The upper magnetic pole layer 35 may be composed of magnetic material capable of forming a film by means such as depositing NiFe or CoNiFe, and material of highly saturated magnetic flux density is preferred. The lower magnetic pole layer 33 is coupled to the upper magnetic pole layer 35 via a connection potion 36, all of which totally form a U-shaped conductive body.

Two coils 37a, 37b made of conductive material such copper are disposed between the upper magnetic pole layer 35 and lower magnetic pole layer 33, and between the air bearing surface and connection portion 36. The coils 37a, 37b wind around the connection portion 36 and provide magnetic flux to the upper magnetic pole layer 35 and lower magnetic pole layer 33. The coil 37a is surrounded by an insulator layer 38 and the coil 37b is surrounded by insulator layers 39, 40, making them insulated from ambience. The coil 37b is coupled to a read layer (not shown) capable of receiving current signal from external. An overcoat layer 41 is provided cover the upper magnetic pole layer 35 and read layer. The overcoat layer 41 may be formed of insulating material e.g. alumina.

In air bearing surface, the rail portion 25a thereof is the most extruded portion with respect to the recording medium P, while the read/write portion 24 is 1-3 mm lower than the rail portion 25a with respect to the recording medium P. The rail portion 25a and 25b may not have a step formed therebetween. The air bearing surface has a 1-4 nm thick protect film 42 composed of Si and DLC (diamond-like carbon) layers formed thereon. An inner portion 43 of the air bearing surface of the slider 21 is a contact surface contacting with the flexure 22 which supports the slider 21.

Figure 4A:
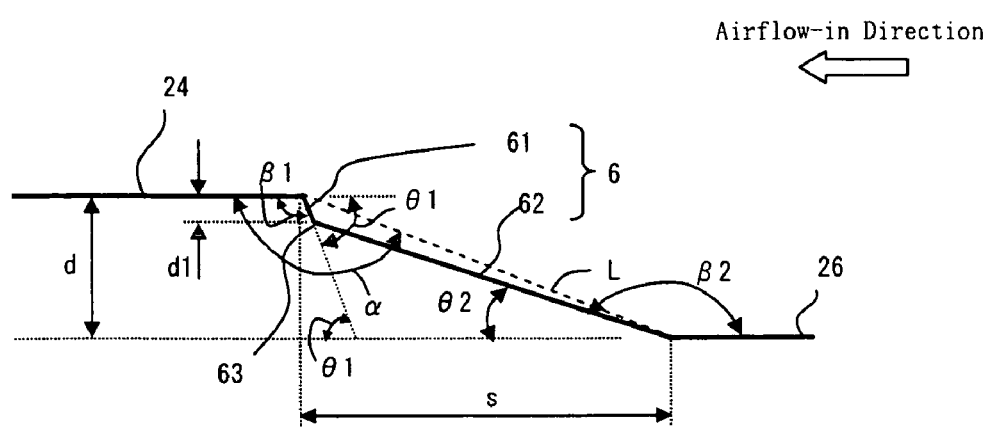
FIGS. 4(a)-4(c) are detailed views partially showing the structure of area A of FIG. 3.
Figure 4B:
Figure 4C:
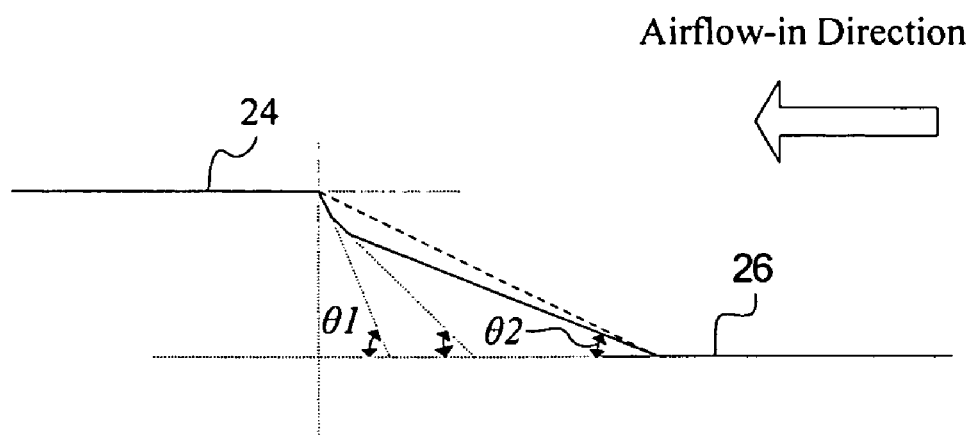

FIG. 4(a) shows a partially enlarged cross-sectional view of a plane parallel to Y-Z plane (see FIG. 2) of the incline portion shown in portion A of FIG. 3. Formation of the incline portion 6 enables an angle α of more than 90 degree existed between a line L and a surface of the read/write portion 24. The line L connects the read/write portion 24 to the concave portion 26 at one end thereof adjacent the airflow inflow direction. The incline portion 6 includes a first incline portion 61 with substantially linear shape and a second incline portion 62 with substantially linear shape. The first incline portion 61 is formed by connecting the read/write portion 24 to a cross angle θ1, while the second incline portion 62 is formed by connection with the first incline portion 61 at one end and connection with a cross angle θ2 at the other end. FIG. 4(b) illustrates a partially enlarged view of an incline portion of prior art, and it is noted that for slider of the embodiment, the cross angle θ1 is greatly larger than the cross angle θ2. In addition, it is preferred that the cross angel θ1, θ2, height difference d between the read/write portion 24 and concave portion 26, height difference d1 between the read/write portion 24 and connection point of the first and second incline portions 61, 62, and length s of the incline portion 6 fall in ranges shown in table 1. Moreover, the cross angle θ1 is supplementary angle of angle β1 formed between surface of the read/write portion 24 and first incline portion 61. In other words, a first incline angle (equals to cross angle θ1) formed between the first incline portion 61 and concave portion 26 or extension line of the concave portion 26 is larger than a second incline angle (equals to cross angle θ2) formed between the first incline portion 61 and concave portion 26 or extension line of the concave portion 26.

TABLE 1

|  | Example 1 | Example 2 |
| --- | --- | --- |
| cross angle θ 1 | 25~35 degree | 70~90 degree |
| cross angle θ 2 | 8~15 degree | 2~5 degree |
| Height difference d | 1.5 µm | 1.5 µm |

TABLE 1-continued

|  | Example 1 | Example 2 |
| --- | --- | --- |
| Height difference d1 | 1/20~1/8 times of height difference d | 1/4~1/5 times of height difference d |
| Length s of the incline portion | 6~10 µm | 20~30 µm |

Shapes in both cases may be utilized in conjunction with the design of rail portion 25a such that slider capable of floating more stably may be manufactured.

In addition, shape of the incline portion may not be limited to a two-segment, incline structure; incline structure of three segments or more segments may also be applied. In these cases, at least one middle incline portion may be provided between the first incline portion and second incline portion of the slider. Each incline angle formed between each middle incline portion and the concave portion 26 is smaller than the first incline angle and reduced gradually from the first incline angle to second incline angle, while bigger than the second incline angle.

Furthermore, shape of the read/write portion may be of a multi-segment structure e.g. two-segment structure, but not limited to the structure abovementioned.

Figure 5:
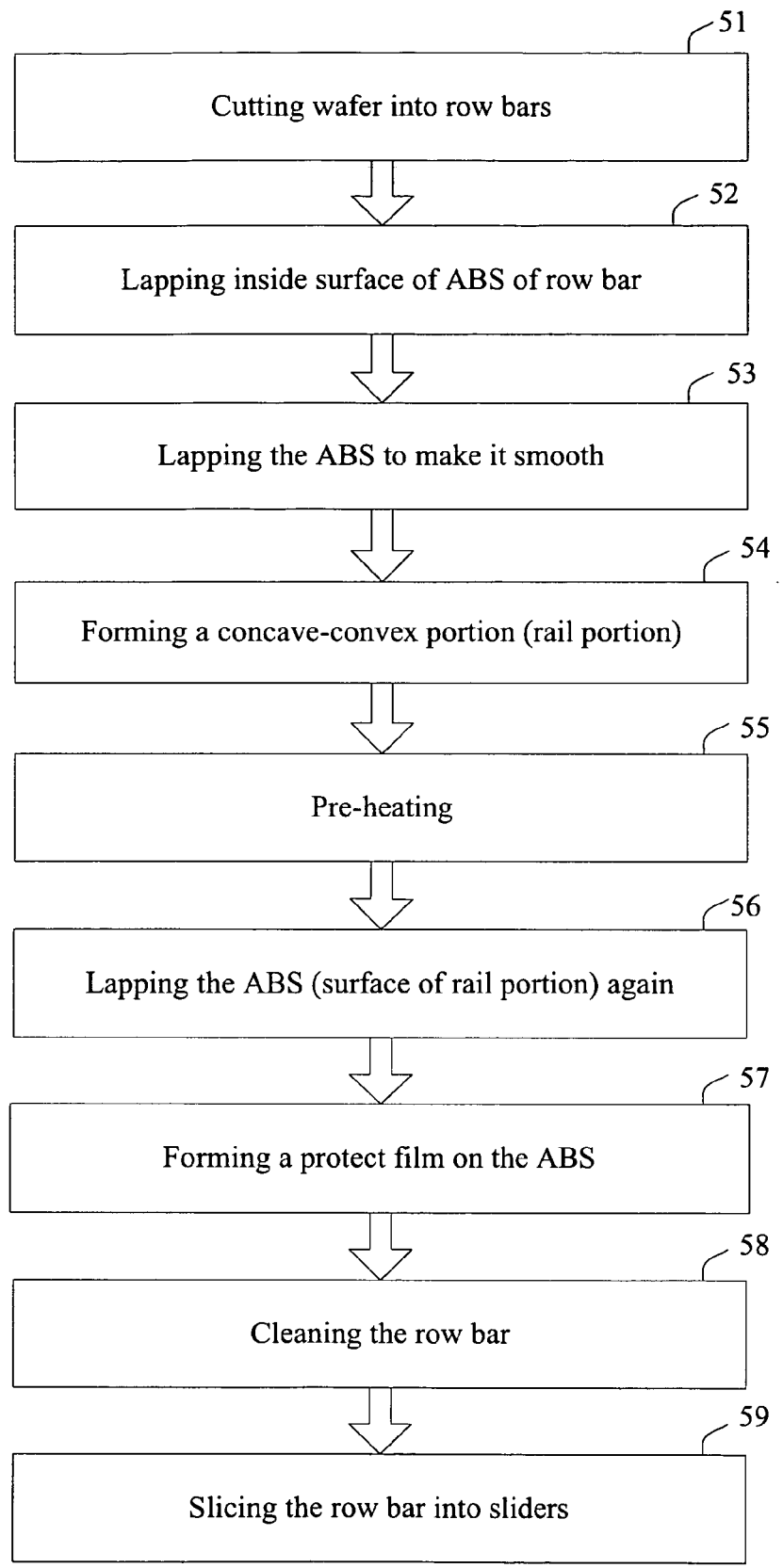
FIG. 5 is a flowchart illustrating slider manufacturing method of the invention.

Then, manufacturing method of the slider described above, especially forming method of the incline portion thereof will be illustrated in conjunction with the flowchart shown in FIG. 5.

Figure 6:
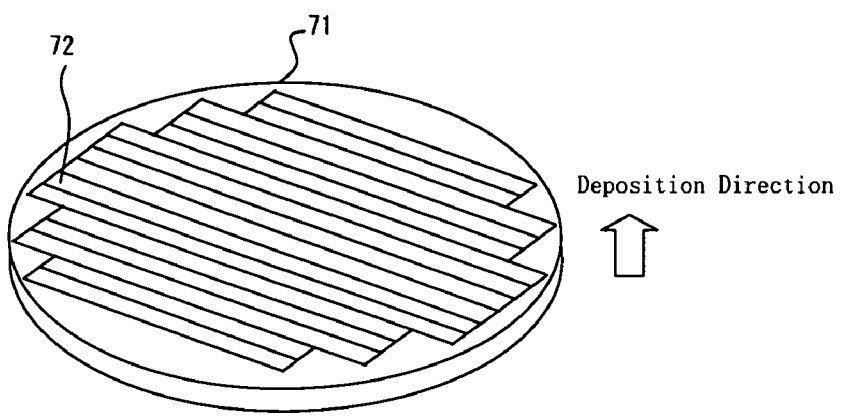
FIGS. 6(a)-6(b) show perspective views of a wafer and row bar respectively, from which a thin film head portion is formed.
Figure 6:
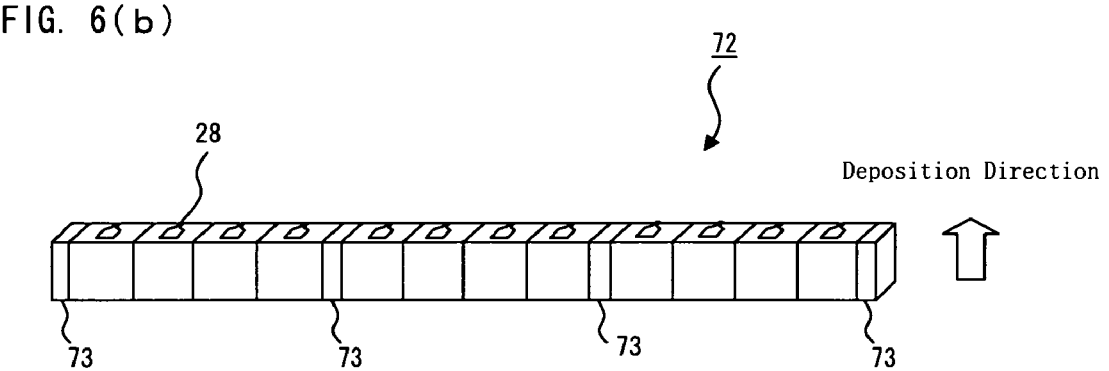

(Step 51) firstly, as shown in FIG. 6(a), a wafer 71 has a plurality of thin film head portions 28 deposited thereon by thin film engineering, and then as shown in FIG. 6(b), the wafer 71 is cut into a plurality of short, bar-shaped row bars 72. After that, each thin film head portion 28 is provided with a test unit 73 in advance, so that lapping volume of the medium with respect to the air bearing surface in step 52 may be controlled.

(Step 52) then, the inner portion 43 of the row bar 72 is ground. The lapping work may be performed as follows: providing solution containing diamond particles or oily lapping slurry, fixing the row bar 72 to a rotary lapping table, and then pressing the inner portion 43, so that it is ground. Thus the inner portion is ground to have a smooth surface and the slider thus manufactured can be mounted to the flexure 22 securely.

Figure 7:
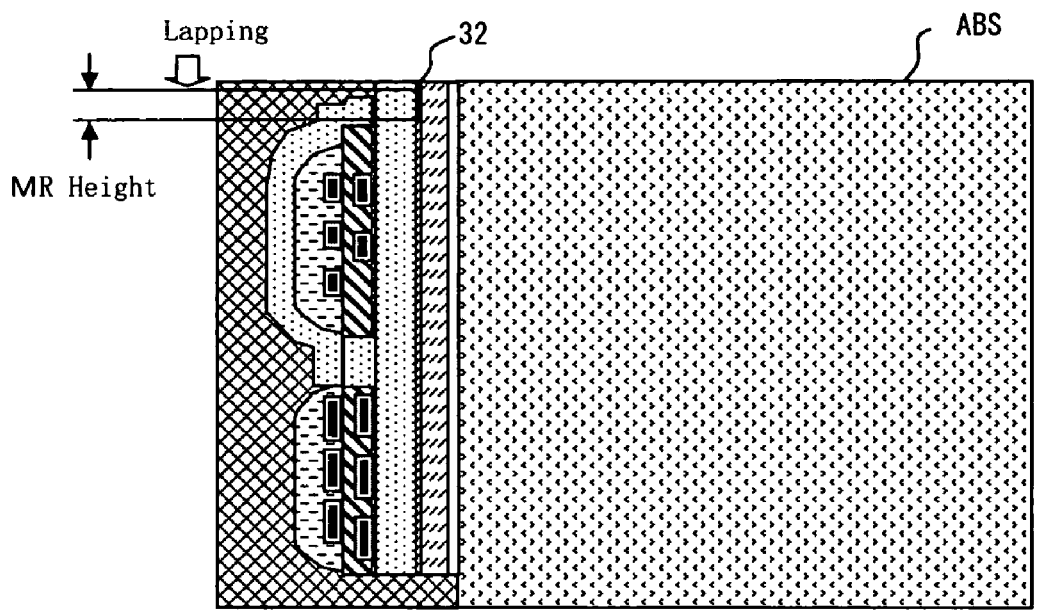
FIG. 7 shows an illustration of a period during manufacture process according to slider manufacturing method of the invention.

(Step 53) then, the air bearing surface is ground. The lapping work is shown in FIG. 7. In MR height (height from one end adjacent the ABS to an opposite end thereof) lapping process of the MR element 32, the MR element 32 has sufficient lapping volume and then the air bearing surface is ground for purpose of attaining desired MR height. The lapping work may be performed as follows: the air bearing surface of the row bar 72 is pressed down to contact a surface of a lapping plate and then be ground. The lapping plate is a circle plate made of Sn with diamond particles embedded therein. As a result, the position of the air bearing surface is moved to an inner side (side where the coil 37a locates) relative to its original position before lapping.

Figure 8:
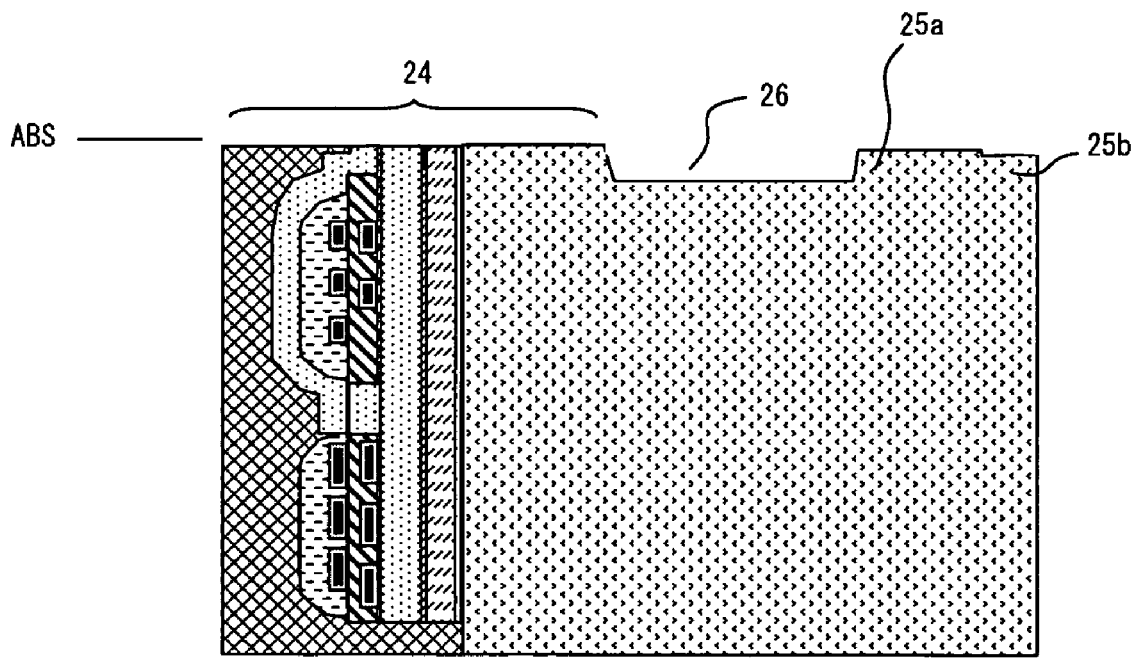
FIG. 8 shows an illustration of another period during manufacture process according to slider manufacturing method of the invention.
Figure 9:
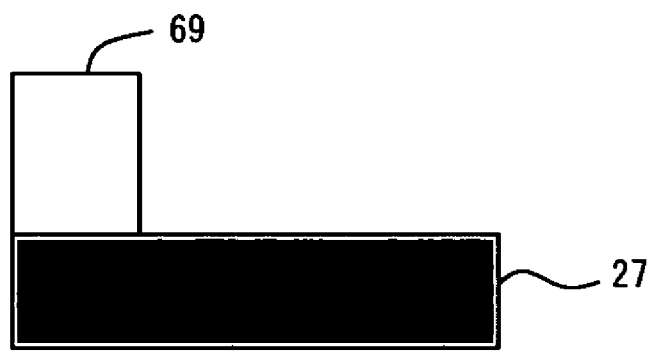
FIGS. 9(a)-9(e) are sequential views illustrating incline portion forming process according to slider manufacturing method of the invention.
Figure 9:
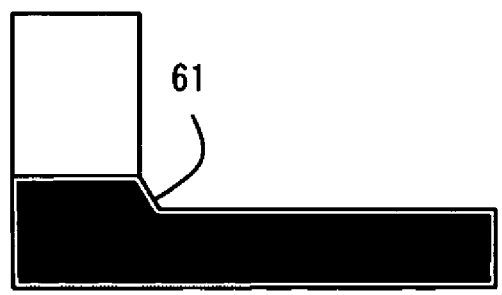
Figure 9:
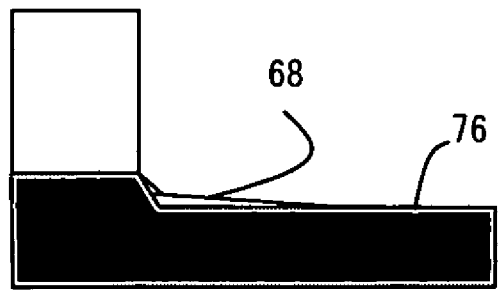
Figure 9:
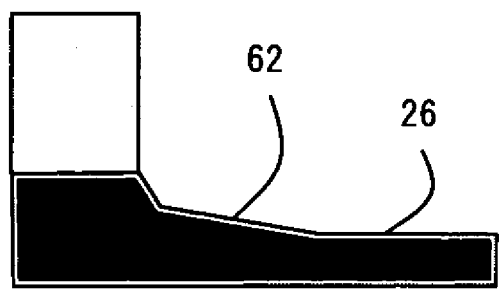
Figure 9:
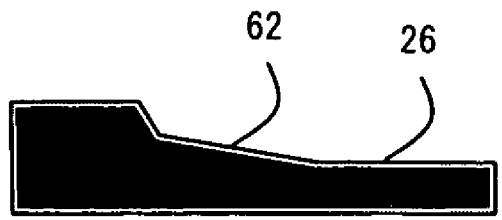

(Step 54) next, as shown in FIG. 8, the convex-concave portion is formed on the air bearing surface. More specifically, part of the air bearing surface is removed by RIE method to form the concave portion 26, rail portion 25b and incline portion 6. The shape in case 2 of table 1 will be taken as an example to illustrate method for forming the incline portion 6 in conjunction with FIG. 9.

Firstly, as shown in FIG. 9(a), a protective layer 69 is formed on the substrate 27 to protect the rail portion 25a and read/write portion 24 from etching.

Then, as shown in FIG. 9(b), a first step of RIE is performed, i.e., etching the substrate 27 covered partially by the protective layer 69 using the RIE method. Etching condition is shown in a first step column of table 2. Reactive gas may be $CF_4$; however, mix gases such as $CF_4$ and inert gas Ar may also be used as reactive gas. According to the first step, a first incline portion 61 is formed. Angle of the first incline portion 61 may be changed by adjusting conditions of the RIE device (such as inside gas pressure of the vacuum chamber, gas flow of $CF_4$, gas flow of Ar or current through the coils) or thickness of the protective layer 69. In addition, the RIE used in steps of the manufacturing method of the invention may be selected properly from manners shown as follows: helicon wave plasma, parallel plate (PP), magnetron, dual frequency excitation, ECR (Electron Cyclotron Resonance) or ICP (Inductively Coupled Plasma).

Next, a second step of RIE is performed, that is, changing directly conditions of RIE to those shown in second step column of table 2 after the first step is completed. 10-45 seconds later after the conditions are changed, as shown in FIG. 9(c), the first incline portion 61 formed in the first step has coating 68 produced thereon. The coating 68 is carbon and DLC (diamond-like carbon) formed in the second step when $C_2H_2$ gas is added. The coating 68 is produced and piled up along whole surface of the substrate 27 and protective layer 69; however, the coating 68 may be sorted as easy-coating portion and difficult-coating portion according to gas flow of the chamber. As shown in FIG. 9(c), the coating accumulates mainly on root portion of the protective layer 69 and around the protective layer 69, i.e., around the first incline portion 61 or on an extension portion 76 of the first incline portion 61.

After that, the substrate 27 is etched by RIE under conditions as those in the second step for 1-10 minutes, such that the first incline portion 61, the second incline portion 62 and concave portion 26 are formed as those shown in FIG. 9(d). Here, the coating 68 produced when the condition is changed in the second step protects the first incline portion 61 and concave portion 76 adjacent the first incline portion 61. As shown in 9(d), region being protected has less etching volume than region not being protected, thus forming the second incline portion 62.

Finally, as shown in FIG. 9(e), the slider is fetched out from the RIE device and the protective layer 69 is peeled off by organic solution. In the step shown in FIG. 9(d), if residue of the coating 68 is not etched off, it may be removed by $O_2$.

TABLE 2

| | First step | Second step |
|---|---|---|
| Gas pressure in vacuum chamber | 0.133 Pa | 1.33 Pa |
| Gas flow of $CF_4$ | 5 ml/min | 45 ml/min |
| Gas flow of $C_2H_2$ | 0 | 18 ml/min |
| Gas flow of Ar | 3.3 ml/min | 0 |
| Power of working table | 600 W | 300 W |
| Power of coils | 200 W | 100 W |

(Step 55) next, the row bar 72 is preheated for 1-2 hours at temperature of 100-200° C. for compensating thermal deformation caused between the substrate 27 and thin film head portion 28 by temperature difference when in lapping and in use as product.

(Step 56) next, the air bearing surface is lapped again at normal temperature. By lapping, the smoothness of the rail portions 25a, 25b and read/write portion 24 is improved, and edges of the rail portions become rounded, thus peeling off of edges and particle absorption around the rail portions are controlled.

(Step 57) next, a protect film 42 with thickness of approximate 1-4 nm is formed on the air bearing surface. The protect film 42 may be of inorganic material such as DLC film or $SiO_2$. The present state is shown in FIG. 3.

(Step 58) next, the row bar 72 is cleaned.

(Step 59) next, the row bar 72 is cut into sliders.

In addition, the row bar of the invention may be cut into sliders in advance and the steps described above may be performed on each slider, or slider cutting may happen among the steps described above. Furthermore, repeating the first and second steps may form a multi-segment incline structure such as three-segment incline structure. In a word, the invention has the following advantages. First, because the incline portion is formed in a two-segment, incline shape by the manufacturing method of the invention, the length variation thereof can be controlled more freely than before. The incline portion of prior art (FIG. 4(b)) has an incline portion length of 2-6 nm and a maximum value thereof is 3 times as big as a minimum value thereof. Comparatively, the incline portion of the invention has a two-segment structure and a variation of maximum/minimum value rate thereof is controllable, and the biggest rate value is 1.7 (Example 1). Additionally, according to the manufacturing method of the invention, a two-segment, incline shape structure may be formed only by ion milling method in prior art, may also be formed by RIE, and time consumed in handling each batch of products is also decreased. For example, a time period of 28 minutes spent in handling using ion milling method is reduced to 22 minutes. Hence, compared to conventional technology of ion milling method, the slider enables to be fabricated in a short time.

In addition, as principle described above, RIE has an advantage of easily controlling surface roughness of the surface being etched. For example, arithmetic mean value of roughness Ra of the incline portion has be improved from previous 8.86 to present 2.38. The arithmetic mean roughness Ra is the definition documented in JIS B0601-1994, in which a datum distance is selected from a roughness curve. Mean value of absolute variation between mean height and actual height of the selected datum distance is defined as the arithmetic mean roughness.

Figure 10:
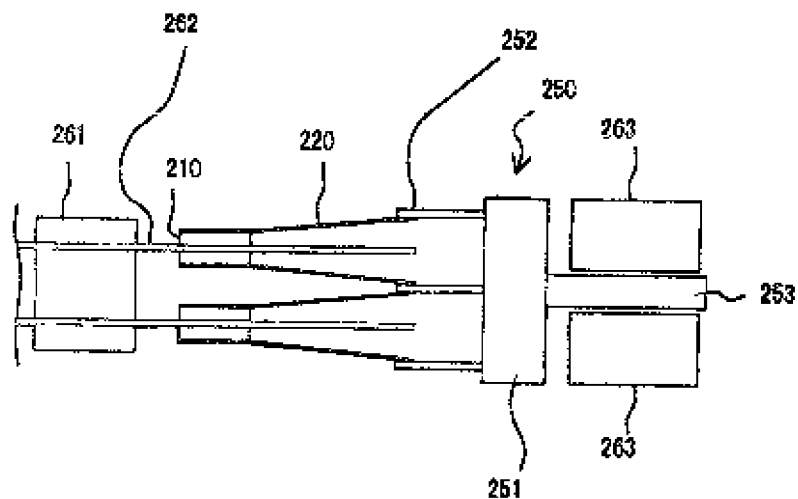
FIG. 10 shows a hard disk drive incorporating a slider of the invention, illustrating important components thereof.
Figure 11:
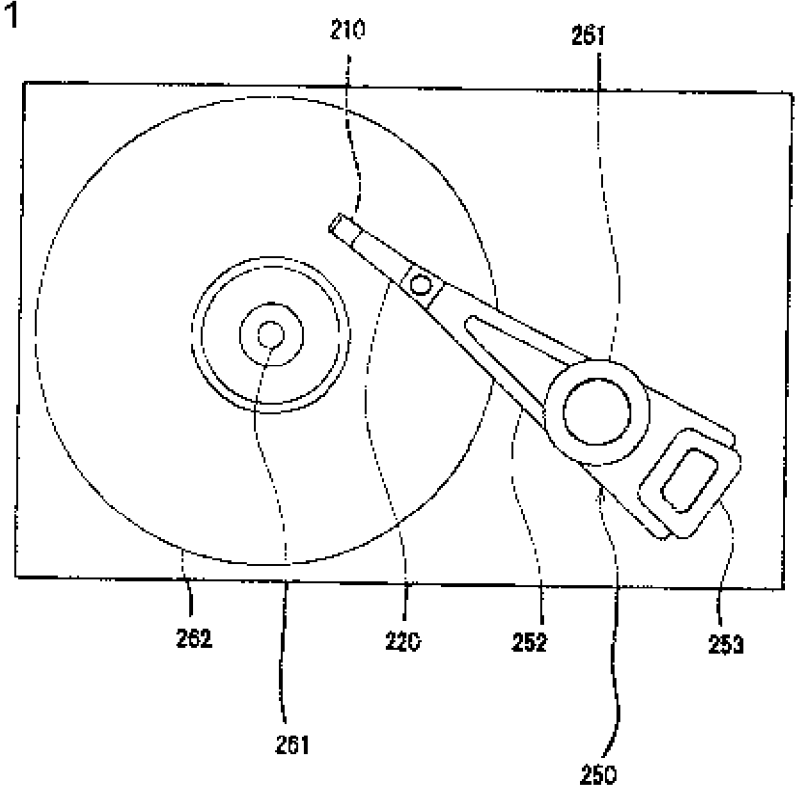
FIG. 11 shows a plan view of a hard disk drive incorporating a slider of the invention.

Finally, referring to FIGS. 10-11, a HGA and hard disk drive incorporating the slider of the invention are described. FIG. 10 shows a hard disk drive incorporating the slider of the invention, illustrating important components thereof; and FIG. 11 shows a plan view of the hard disk drive. The head suspension assembly 250 includes a suspension 251 having a plurality of drive arms 252. A plurality of HGAs 220 separated from each other with a certain distance is mounted to the plurality of drive arms 252 respectively. A coil 253 making part of a voice coil motor is mounted at an opposite end of the suspension 251. The head suspension assembly 250 may be assembled to the hard disk drive. The hard disk drive has a plurality of disks 262 mounted to a spindle motor 261. Each disk 262 has a pair of sliders 210 mounted thereon, so that respective disk 262 is sandwiched between the two sliders. In addition, the voice coil motor includes permanent magnets 263, between which the coil 253 of the head suspension assembly 250 is disposed.

Besides the slider 210, corresponding to positioning device of the invention, the head suspension assembly 250 and adjustor (not shown) support the slider 210, and at the same time position the slider 210 on the disk 262.

In hard disk drive of the invention, the position of the slider 210 is determined with respect to the disk 262 at a transverse direction along which the slider 210 is moved to a track of the disk 262 by the adjustor. The thin film head incorporated in the slider 210 stores data into the disk 262 via a recording head, or reproduces data recorded in the disk 262.

What is claimed is:

1. A slider comprising: a read/write portion disposed on an air bearing surface of the slider opposite to a recording medium in convex configuration, which comprises at least one of a write element for writing information to the recording medium and a read element for reading information from the recording medium;
    an incline portion to connect the read/write portion with a concave portion of the air bearing surface, where airflow flows in when the recording medium rotates, an angle more than 90 degrees being formed between a line and surface of the read/write portion, said line connecting the read/write portion and the concave portion; wherein:
    the incline portion includes a first incline portion with substantially linear shape connected with the surface of the read/write portion and a second incline portion with substantially linear shape connected with the concave portion;
    a first incline angle of the concave portion with respect to the first incline portion is larger than a second incline angle of the concave portion with respect to the second incline portion;
    at least one middle incline portion is formed between the first incline portion and second incline portion, said each middle incline portion being connected with each other from the first incline portion to second incline portion, each middle incline angle being formed between each middle incline portion and respective concave portion, said each middle incline angle being smaller than the first incline angle and decreased gradually from a middle incline portion connected with the first incline portion to another middle incline portion connected with the second incline portion, while larger than the second incline angle.

2. The slider of claim 1, wherein the first incline angle ranges from 25-35 degrees, and the second incline angle ranges from 8-15 degrees.

3. The slider of claim 2, wherein a height of the first incline portion is about 1/20 to about 1/8 times as high as a height formed between the read/write portion and the concave portion.

4. The slider of claim 3, wherein a length of the incline portion along an airflow-in direction is about 4-6 times as large as a height of the convex configuration.

5. The slider of claim 1, wherein the first incline angle ranges from 70-90 degrees, and the second incline angle ranges from 2-5 degrees.

6. The slider of claim 5, wherein a height of the first incline portion is about 1/5 to about 1/4 times as high as a height formed between the read/write portion and the concave portion.

7. The slider of claim 6, wherein a length of the incline portion along an airflow-in direction is about 14 to about 20 times as large as a height of the convex configuration.

8. A head gimbal assembly comprising:
    a slider of claim 1 configured in relation to a recording medium, and a suspension to resiliently support the slider.

9. A hard disk drive comprising:
    a slider of claim 1, said slider being disposed in relation to the rotating recording medium; and
    a positioning device to support the slider and displace the slider on the recording medium.

10. A manufacturing method of a slider, the slider comprising a substrate and an incline portion, said incline portion being disposed with a convex configuration on an air bearing surface opposite to a recording medium of the substrate, said incline portion connecting a write element which writes information to said recording medium with a concave portion of the air bearing surface, where airflow flows in when the recording medium rotates, an angle of more than 90 degrees being formed between a line and surface of a read/write portion, the line connecting the read/write portion and the concave portion, the manufacturing method comprising:
    forming a protective layer on the substrate, said substrate having the read/write portion formed thereon;
    forming a first incline portion by etching the substrate incorporating the protective layer by a reactive ion etching method with a first reactive gas containing CF4 introduced therein, said first incline portion being formed between the substrate and bottom position at one end of the protective layer where airflow comes in, said first incline portion having a substantially linear shape and being connected to the surface of the read/write portion;
    depositing coatings on the substrate incorporating the first incline portion by a reactive ion etching method with a second reactive gas containing CF4 and C2H2, said coatings being formed on the first incline portion and surface of the substrate, said surface of the substrate being adjacent the first incline portion and extending along a direction away from the protective layer;
    forming a second incline portion by etching the substrate incorporating the coating by a reactive ion etching method with the second reactive gas introduced therein, the second incline portion having a substantially linear shape and being connected to the concave portion and surface thereof, the second incline portion making an incline angle between itself and the concave portion, the incline angle being smaller than another incline angle formed by the first incline portion and the concave portion,
    wherein at least one middle incline portion is formed between the first incline portion and second incline portion, said each middle incline portion being connected with each other from the first incline portion to second incline portion, each middle incline angle being formed between each middle incline portion and respective concave portion, said each middle incline angle being smaller than the first incline angle and decreased gradually from a middle incline portion connected with the first incline portion to another middle incline portion connected with the second incline portion, while larger than the second incline angle.

11. The slider manufacturing method of claim 10, wherein the reactive gas used during the forming of the first incline portion also contains argon.

12. The slider manufacturing method of claim 10, wherein the forming of the first incline portion includes changing the reactive gas directly to the second reactive gas after completion of the forming of the protective layer, and then performing an etching process for 10-45 seconds.

13. The slider manufacturing method of claim 12, wherein the forming the second incline portion includes a constant etching process for 1-10 minutes after completion of the forming of the first incline portion.

14. The slider manufacturing method of claim 13, wherein reactive gas used in the etching process of the forming of the second incline portion is still the second reactive gas.

15. The slider manufacturing method of claim 10, further comprising removing the protective layer using an organic solution after completion of the forming of the second incline portion.

16. The slider manufacturing method of claim 10, further comprising removing the coatings by oxygen after completing of forming of the second incline portion.

* * * * *